United States Patent
Hall et al.

(10) Patent No.: US 8,159,793 B2
(45) Date of Patent: Apr. 17, 2012

(54) ARC DETECTION USING DETAILED AND APPROXIMATE COEFFICIENTS FROM DISCRETE WAVELET TRANSFORMS

(75) Inventors: Scott Jeffrey Hall, Louisville, KY (US); John Kenneth Hooker, Louisville, KY (US); Konstantin Vladimir Grigoryan, Louisville, KY (US); Sriram Changali, Cochin (IN)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 12/341,166

(22) Filed: Dec. 22, 2008

(65) Prior Publication Data

US 2010/0157488 A1 Jun. 24, 2010

(51) Int. Cl.
*H02H 3/00* (2006.01)
(52) U.S. Cl. .......................................................... 361/42
(58) Field of Classification Search ................. 361/42
See application file for complete search history.

(56) References Cited

U.S. PATENT DOCUMENTS

| | | | |
|---|---|---|---|
| 4,514,709 A | 4/1985 | Nakano et al. |
| 5,185,684 A | 2/1993 | Beihoff et al. |
| 5,185,685 A | 2/1993 | Tennies et al. |
| 5,185,686 A | 2/1993 | Hansen et al. |
| 5,185,687 A | 2/1993 | Beihoff et al. |
| 5,208,542 A | 5/1993 | Tennies et al. |
| 5,223,795 A | 6/1993 | Blades |
| 5,434,509 A | 7/1995 | Blades |
| 5,452,223 A | 9/1995 | Zuercher et al. |
| 5,485,093 A | 1/1996 | Russell et al. |
| 5,506,789 A | 4/1996 | Russell et al. |
| 5,512,832 A | 4/1996 | Russell et al. |
| 5,550,751 A | 8/1996 | Russell |
| 5,561,605 A | 10/1996 | Zuercher et al. |
| 5,578,931 A | 11/1996 | Russell et al. |
| 5,600,526 A | 2/1997 | Russell et al. |

(Continued)

FOREIGN PATENT DOCUMENTS

| | | |
|---|---|---|
| AU | 2566699 A | 9/1999 |
| AU | 5878700 A | 1/2001 |

(Continued)

OTHER PUBLICATIONS

Al-Dabbagh et al.; "Improved microprocessor based distribution feeder earth fault protection using pattern recognition"; Proceedings of the Fourth International Conference on Development in Power Protection 1989; pp. 172-176.

(Continued)

*Primary Examiner* — Rexford N Barnie
*Assistant Examiner* — Tien Mai
(74) *Attorney, Agent, or Firm* — Cantor Colburn LLP (57) ABSTRACT

An apparatus for facilitating interruption of current in an electrical circuit is provided and includes a current sensing device in the electrical circuit to service an electrical load, the current sensing device being productive of an output signal representative of a load current passing therethrough, a detection unit, in signal communication with the current sensing device such that the output signal is received by the detection unit, the detection unit being configured and disposed to output a secondary signal based on the output signal, and a microcontroller to receive and to decompose the secondary signal into detailed and approximate coefficients, and to generate a trip signal for use in interrupting an operation of the electrical circuit when a current of the sensed load is above a predetermined threshold and the detailed and approximate coefficients cooperatively indicate that threshold conditions for trip signal generation are satisfied.

8 Claims, 6 Drawing Sheets

U.S. PATENT DOCUMENTS

| | | | |
|---|---|---|---|
| 5,659,453 A | 8/1997 | Russell et al. |
| 5,682,101 A | 10/1997 | Brooks et al. |
| 5,691,869 A | 11/1997 | Engel et al. |
| 5,726,577 A | 3/1998 | Engel et al. |
| 5,729,145 A | 3/1998 | Blades |
| 5,805,397 A | 9/1998 | MacKenzie |
| 5,815,352 A | 9/1998 | MacKenzie |
| 5,835,321 A | 11/1998 | Elms et al. |
| 5,839,092 A | 11/1998 | Erger et al. |
| 5,933,305 A | 8/1999 | Schmalz et al. |
| 5,969,920 A | 10/1999 | MacKenzie |
| 5,982,593 A | 11/1999 | Kimblin et al. |
| 5,986,860 A | 11/1999 | Scott |
| 6,031,699 A | 2/2000 | Dollar, II et al. |
| 6,052,046 A | 4/2000 | Ennis et al. |
| 6,128,170 A | 10/2000 | Daum |
| 6,191,589 B1 | 2/2001 | Clunn |
| 6,195,241 B1 | 2/2001 | Brooks et al. |
| 6,198,611 B1 | 3/2001 | MacBeth |
| 6,232,857 B1 | 5/2001 | Mason, Jr. et al. |
| 6,239,962 B1 | 5/2001 | Seymour et al. |
| 6,255,923 B1 | 7/2001 | Mason, Jr. et al. |
| 6,259,996 B1 | 7/2001 | Haun et al. |
| D450,660 S | 11/2001 | Seymour et al. |
| 6,313,642 B1 | 11/2001 | Brooks |
| 6,362,628 B2 | 3/2002 | Macbeth et al. |
| 6,373,257 B1 | 4/2002 | MacBeth et al. |
| 6,377,055 B1 | 4/2002 | MacBeth |
| 6,388,849 B1 | 5/2002 | Rae |
| 6,414,829 B1 | 7/2002 | Haun |
| 6,417,671 B1 | 7/2002 | Tiemann |
| 6,426,632 B1 | 7/2002 | Clunn |
| 6,459,273 B1 | 10/2002 | Dollar, II et al. |
| 6,504,692 B1 | 1/2003 | Macbeth et al. |
| 6,522,228 B2 | 2/2003 | Wellner et al. |
| 6,522,509 B1 | 2/2003 | Engel et al. |
| 6,532,139 B2 | 3/2003 | Kim et al. |
| 6,538,863 B1 | 3/2003 | MacBeth |
| 6,542,056 B2 | 4/2003 | Nerstrom et al. |
| 6,545,574 B1 | 4/2003 | Seymour et al. |
| 6,556,397 B2 | 4/2003 | Kim et al. |
| 6,570,392 B2 | 5/2003 | Macbeth et al. |
| 6,590,754 B1 | 7/2003 | MacBeth |
| 6,608,741 B1 | 8/2003 | MacBeth |
| 6,621,669 B1 | 9/2003 | Haun et al. |
| 6,625,550 B1 | 9/2003 | Scott et al. |
| 6,628,487 B1 | 9/2003 | Macbeth |
| 6,633,467 B2 | 10/2003 | Macbeth et al. |
| 6,642,832 B2 | 11/2003 | Pellon et al. |
| 6,654,219 B1 | 11/2003 | Romano et al. |
| 6,678,137 B1 | 1/2004 | Mason, Jr. et al. |
| 6,703,842 B2 | 3/2004 | Itimura et al. |
| 6,707,651 B2 | 3/2004 | Elms et al. |
| 6,720,872 B1 | 4/2004 | Engel et al. |
| 6,777,953 B2 | 8/2004 | Blades |
| 6,798,628 B1 | 9/2004 | Macbeth |
| 6,833,713 B2 | 12/2004 | Schoepf et al. |
| 6,839,208 B2 | 1/2005 | Macbeth et al. |
| 6,876,203 B2 | 4/2005 | Blades |
| 6,882,158 B2 | 4/2005 | Blades |
| 6,927,579 B2 | 8/2005 | Blades |
| 6,927,597 B2 | 8/2005 | Kliman et al. |
| 6,972,937 B1 | 12/2005 | Macbeth et al. |
| 6,980,407 B2 | 12/2005 | Kawate et al. |
| 6,999,289 B2 | 2/2006 | MacBeth et al. |
| 7,009,406 B2 | 3/2006 | Naidu et al. |
| 7,069,116 B2 | 6/2006 | Kunsman et al. |
| 7,106,069 B2 | 9/2006 | Kim et al. |
| 7,136,265 B2 | 11/2006 | Wong et al. |
| 7,148,696 B2 | 12/2006 | Zhou et al. |
| 7,151,656 B2 | 12/2006 | Dvorak et al. |
| 7,205,772 B2 | 4/2007 | Naidu et al. |
| 7,253,637 B2 | 8/2007 | Dvorak et al. |
| 7,359,168 B2 | 4/2008 | Elms et al. |
| 7,362,553 B2 | 4/2008 | Elms et al. |
| 7,391,218 B2 | 6/2008 | Kojori et al. |
| 7,403,129 B2 | 7/2008 | Zhou et al. |
| 7,409,303 B2 | 8/2008 | Yeo et al. |
| 7,463,465 B2 | 12/2008 | Rivers, Jr. et al. |
| 2001/0033469 A1 | 10/2001 | Macbeth et al. |
| 2001/0036047 A1 | 11/2001 | Macbeth et al. |
| 2002/0033701 A1 | 3/2002 | Macbeth et al. |
| 2002/0038199 A1 | 3/2002 | Blemel |
| 2002/0051546 A1 | 5/2002 | Bizjak |
| 2002/0080003 A1 | 6/2002 | Pellon et al. |
| 2002/0085327 A1 | 7/2002 | Kim et al. |
| 2002/0097056 A1 | 7/2002 | Blades |
| 2002/0130668 A1 | 9/2002 | Blades |
| 2002/0196031 A1 | 12/2002 | Blades |
| 2003/0072113 A1 | 4/2003 | Wong et al. |
| 2003/0074148 A1 | 4/2003 | Dvorak et al. |
| 2003/0098982 A1 | 5/2003 | McLeod et al. |
| 2003/0201780 A1 | 10/2003 | Blades |
| 2003/0205460 A1 | 11/2003 | Buda |
| 2004/0043255 A1 | 3/2004 | Horai et al. |
| 2004/0095695 A1 | 5/2004 | Kim et al. |
| 2004/0100274 A1 | 5/2004 | Gloster et al. |
| 2004/0150410 A1 | 8/2004 | Schoeqf et al. |
| 2004/0172207 A1 | 9/2004 | Hancock et al. |
| 2004/0182697 A1 | 9/2004 | Buda |
| 2005/0207083 A1 | 9/2005 | Rivers et al. |
| 2005/0264962 A1 | 12/2005 | Kim et al. |
| 2006/0015703 A1 | 1/2006 | Ramchandran et al. |
| 2006/0164097 A1 | 7/2006 | Zhou et al. |
| 2006/0203401 A1 | 9/2006 | Kojori et al. |
| 2006/0214670 A1 | 9/2006 | Naidu et al. |
| 2006/0279883 A1 | 12/2006 | Elms et al. |
| 2007/0057678 A1 | 3/2007 | Dvorak et al. |
| 2007/0086124 A1 | 4/2007 | Elms et al. |
| 2007/0260346 A1 | 11/2007 | Ganesan et al. |
| 2007/0263329 A1 | 11/2007 | Zhou et al. |
| 2008/0106832 A1* | 5/2008 | Restrepo et al. ................ 361/42 |
| 2008/0238404 A1 | 10/2008 | Ferguson |
| 2009/0088988 A1 | 4/2009 | Muthu-Mannivannan et al. |
| 2009/0168277 A1* | 7/2009 | Changali et al. ................ 361/42 |

FOREIGN PATENT DOCUMENTS

| | | |
|---|---|---|
| AU | 200121223 B2 | 8/2001 |
| CA | 2248924 A1 | 3/1998 |
| CA | 2248924 | 9/1998 |
| CA | 2307172 | 4/2000 |
| CA | 2334134 | 2/2001 |
| CA | 2336769 | 2/2001 |
| CA | 2337446 | 2/2001 |
| CA | 2334134 A1 | 8/2001 |
| CA | 2307172 A1 | 10/2001 |
| CA | 2369429 | 7/2002 |
| CA | 2445690 | 5/2004 |
| CA | 2549709 | 12/2006 |
| CA | 2549709 A1 | 12/2006 |
| EP | 1126572 A2 | 8/2001 |
| EP | 1126572 A3 | 10/2005 |
| EP | 1329733 B1 | 5/2006 |
| EP | 1657559 A1 | 5/2006 |
| GB | 2381607 A | 5/2003 |
| JP | 2001281290 A | 10/2001 |
| JP | 2002300717 A | 10/2002 |
| JP | 2005049326 | 2/2005 |
| JP | 2005049326 A | 2/2005 |
| KR | 4042607 A | 11/2002 |
| KR | 1020040042607 A | 5/2004 |
| MX | PA01001612 A | 5/2002 |
| WO | 9403820 | 2/1994 |
| WO | 9422031 | 9/1994 |
| WO | 9635250 | 11/1996 |
| WO | 2006121496 A1 | 11/2006 |
| WO | 2007032944 A2 | 3/2007 |
| WO | 2007032944 A3 | 3/2007 |
| WO | 2007035488 A2 | 3/2007 |
| WO | 2007035488 A3 | 3/2007 |
| WO | 2007045976 A1 | 4/2007 |
| WO | 2007129213 A1 | 11/2007 |

OTHER PUBLICATIONS

Cristan et al.; "Multitaper Power Spectrum Estimation and Thresholding: Wavelet Packets Versus Wavelets"; IEEE Transactions on Signal Processing, vol. 50, No. 12, Dec. 2002; pp. 2976-2986.

Elkalashy; "Modeling and Detection of High Impedance Arcing Fault in Medium Voltage Networks"; TKK Dissertations 95, Espoo 2007.

Kadiver et al.; "An Adaptive Auto Reclosure Scheme using Wavelet Transform"; University of Tehran, Tehran, Iran.

Lai et al.; "Wavelet Transform Based Relay Algorithm for the Detection of Stochastic High Impedance Faults"; International Conference on Power Systems Transients—IPST 2003 in New Orleans, USA.

Leung; "Predictive Maintenance of Circuit Breakers"; University of Waterloo, Waterloo, Ontario, Canada.

Sedighi et al.; "High impedance fault detection based on wavelet transform and statistical pattern recognition"; IEEE Transactions on Power Delivery, vol. 20, Issue 4, Oct. 2005; pp. 2414-2421.

Sultan et al.; "Detection of high impedance arcing faults using a multi-layer perceptron"; IEEE Transaction on Power Delivery, vol. 7, Issue 4, 1992; pp. 1871-1877.

Wen-Jun Li et al.; "Arc Fault Detection Based on Wavelet Packet"; Proceedings of the Fourth International Conference onMachine Learning and Cybernetics, Guangzhou, Aug. 18-21, 2005; 0-7803-909101/05; 2005 IEEE; pp. 1783-1788.

Sriram Changali et al.; "Arc Detection Using Discrete Wavelet Transformations"; filed Jul. 23, 2008 as U.S. Appl. No. 12/178,216 (Abandoned).

* cited by examiner

ARC DETECTION USING DETAILED AND APPROXIMATE COEFFICIENTS FROM DISCRETE WAVELET TRANSFORMS

BACKGROUND OF THE INVENTION

Aspects of the present invention are directed to electrical systems and, more particularly, to methods and systems for arc detection in electrical systems.

BRIEF DESCRIPTION OF THE BACKGROUND

Electrical systems in residential, commercial, and industrial applications usually include a panel board for receiving electrical power from a utility source. The received power is then routed through the panel board to one or more current interrupters such as, but not limited to circuit breakers, trip units, and others.

Each current interrupter distributes the power to a designated branch, where each branch supplies one or more loads with the power. The current interrupters are configured to interrupt the power to the particular branch if certain power conditions in that branch reach a predetermined set point.

For example, some current interrupters can interrupt power due to a ground fault and are commonly known as ground fault current interrupters (GFCIs). The ground fault condition results when an imbalance of current flows between a line conductor and a neutral conductor and could be caused by a leakage of current or an arcing fault to ground.

Other current interrupters can interrupt power due to an arcing fault and are commonly known as arc fault current interrupters (AFCIs). Arcing faults may be generally defined as either series arcs or parallel arcs. Series arcs can occur, for example, when current passes across a gap in a single conductor. Parallel arcs, on the other hand, can occur when current passes between two conductors. Unfortunately, both types of arcing faults may, for various reasons, not cause a conventional current interrupter to trip. This is particularly true when a series arc occurs because the current sensing device in the current interrupter is unable to distinguish between a series arc and a normal load current.

SUMMARY OF THE INVENTION

In accordance with an aspect of the invention, an apparatus for facilitating interruption of current in an electrical circuit is provided and includes a current sensing device disposed in the electrical circuit to service an electrical load, the current sensing device being productive of an output signal representative of a load current passing therethrough, a detection unit, in signal communication with the current sensing device such that the output signal produced by the current sensing device is received by the detection unit, the detection unit being configured and disposed to output a secondary signal based on the output signal, and a microcontroller, coupled to the detection unit, being responsive to computer executable instructions which, when executed by the microcontroller, cause the microcontroller to receive and to decompose the secondary signal into detailed and approximate coefficients, and to generate a trip signal for use in interrupting an operation of the electrical circuit when a current of the sensed load is above a predetermined threshold and the detailed and approximate coefficients cooperatively indicate that threshold conditions for trip signal generation are satisfied.

In accordance with another aspect of the invention, a computer implemented method of performing arc fault current interruption (AFCI) for a circuit is provided and includes sensing a load current at a current sensing device in electrical communication with the circuit, generating a secondary signal reflective of a current of the sensed load current at a detection unit in signal communication with the current sensing device, sampling the secondary signal at a first predetermined frequency at a microcontroller coupled to the detection unit, when the sampling of the secondary signal is determined to be complete and when a zero cross of the secondary signal is determined to have been sampled, computing detailed coefficients from first components of the secondary signal and approximate coefficients from second components of the secondary signal, determining if threshold criteria are determined to have been met based on the first coefficients or, if the sensed load current is below a predetermined threshold, based on the detailed and approximate coefficients, and, if so, issuing a trip signal to interrupt an operation of the circuit.

In accordance with another aspect of the invention, a computer implemented method of performing arc fault current interruption (AFCI) for a circuit is provided and includes decomposing first and second portions of a secondary signal, which is generated at a detection unit as being based on a load current sensed by a current sensing device with which the detection unit is in signal communication, into detailed and approximate coefficients, respectively, using discrete wavelet transforms, with the first portion of the secondary signal determined to have been zero cross sampled, computing a sum of absolute values of the detailed coefficients and computing absolute values and a ratio of sums thereof of the approximate coefficients for first and second windows of the secondary signal, comparing the sum of the absolute values with a first predetermined threshold or, if a current of the sensed load is below a pre-selected magnitude, comparing a product of the sum of the absolute values and the ratio of sums with a second predetermined threshold, and issuing a trip signal to interrupt an operation of the circuit if a result of the comparison indicates that the corresponding one of the first and second predetermined thresholds is exceeded with a predetermined frequency over a given period of time.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
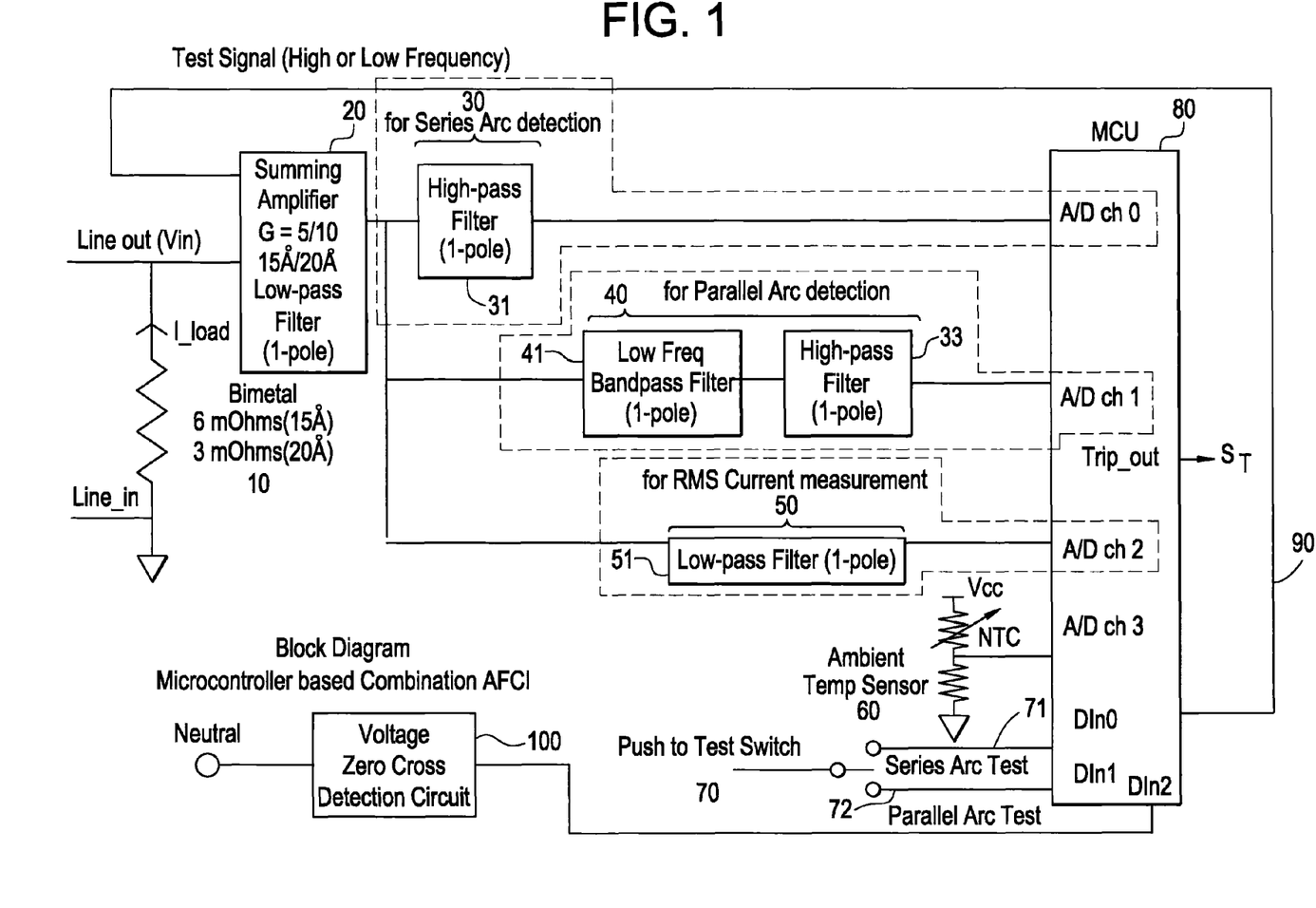
FIG. 1 is a schematic diagram of a microcontroller based combination arc fault current interrupter.

With reference to FIG. 1, an apparatus for facilitating interruption of current in an electrical circuit by performing arc fault current interruption (AFCI) is provided and includes a current sensing device 10, such as a bimetal, hall effect sensors, MEMs, CTs etc, which is configured to sense a load from which a current signal is generated. The current sensing device 10 may be formed of resistive materials that have a characteristic resistance at room temperature of 6 mOhms (milli-ohms) (at 15 A) or 3 mOhms (at 20 A). The current sensing device 10 is electrically coupled to a signal line along which a summing amplifier 20, including a low pass filter, is disposed. The current signal, therefore, flows from the current sensing device 10 and to the summing amplifier 20 along with a test signal 90 that may be outputted by a microcontroller 80.

While embodiments of the invention are disclosed having a bimetal as an example current sensing device 10, it will be appreciated that the scope of the invention is not so limited and also encompasses other resistive elements suitable for the purposes disclosed herein, such as, for example, brass, bronze, copper alloy, steel, stainless steel, inconel steel and/or carbon-steel alloys.

The signal line is coupled to a first arc detection unit 30, such as a series arc detection unit 30, a current measurement unit 50, such as a root mean square current measurement unit, a p-p current measurement unit, a Hall effect current sensor or any other suitable device, and, optionally, a second arc detection unit 40, such as a parallel arc detection unit 40. The first arc detection unit 30 is configured to output a secondary signal to the microcontroller 80 for use in detecting an arcing condition (e.g., a series arc) in the sensed load current. The second arc detection unit 40 is similarly configured to output an additional secondary signal to the microcontroller 80 for use in detecting an arcing condition (e.g., a parallel arc) in the sensed load current. The current measurement unit 50 is configured to detect a current in the sensed load current and to output a yet another secondary signal to the microcontroller 80, which is based on the detected current, for use in the performance of, e.g., current dependent offset calculations, RMS current measurement and arc detection sample timing.

In the present context, series and parallel arcs refer to electric breakdowns of a normally nonconductive media, such as air, that produce luminous electrical discharges, such as sparks, which result from current flowing through the normally nonconductive media. Series arcs occur in series with the load current where, as an example, a current carrying line is broken. As such, series arc current can be no higher than the load current. Conversely, parallel arcs occur between oppositely charged conductors, such as a circuit and a grounded element, and may be characterized by high current spikes and little or no load impedance.

The first arc detection unit 30 operates at a sampling rate of 300 kHz and filters all but those signals having frequencies of about 1 kHz-250 kHz from the current signal. To this end, the first arc detection unit 30 includes a high pass filter 31 which operates cooperatively with the low pass filter of the summing amplifier 20. Where, the second arc detection unit 40 is employed, the second arc detection unit 40 operates at a sampling rate of 10 kHz and filters all but those sub-signals having frequencies of about 150-900 Hz from the current signal. To this end, the second arc detection unit 40 includes a low pass filter 41 and a high pass filter 42. The current measurement unit 50 operates at a sampling rate of 10 kHz and includes a low pass filter 51.

The microcontroller 80 is configured to decompose at least the secondary signal received from the first arc detection unit 30. The decomposition is accomplished via discrete wavelet transforms DWTs, such as mother wavelets, which are obtained from external computations and at least partly from information contained within the signal received from the current measurement unit 50.

A result of the decomposition is the further filtering of the secondary signal received from the first arc detection unit 30 into first and second frequency components in which, in an embodiment of the invention, the first frequency is higher than the second frequency. That is, the secondary signal is decomposed into a first or high frequency component including those portions thereof having frequencies of about 75-250 kHz, from which first coefficients (hereinafter referred to as "detailed coefficients") are obtained, and a second or low frequency component including those portions thereof having frequencies of about ~1-75 kHz, from which first and second sets of second coefficients (hereinafter referred to as "approximate coefficients") are obtained.

Figure 2:
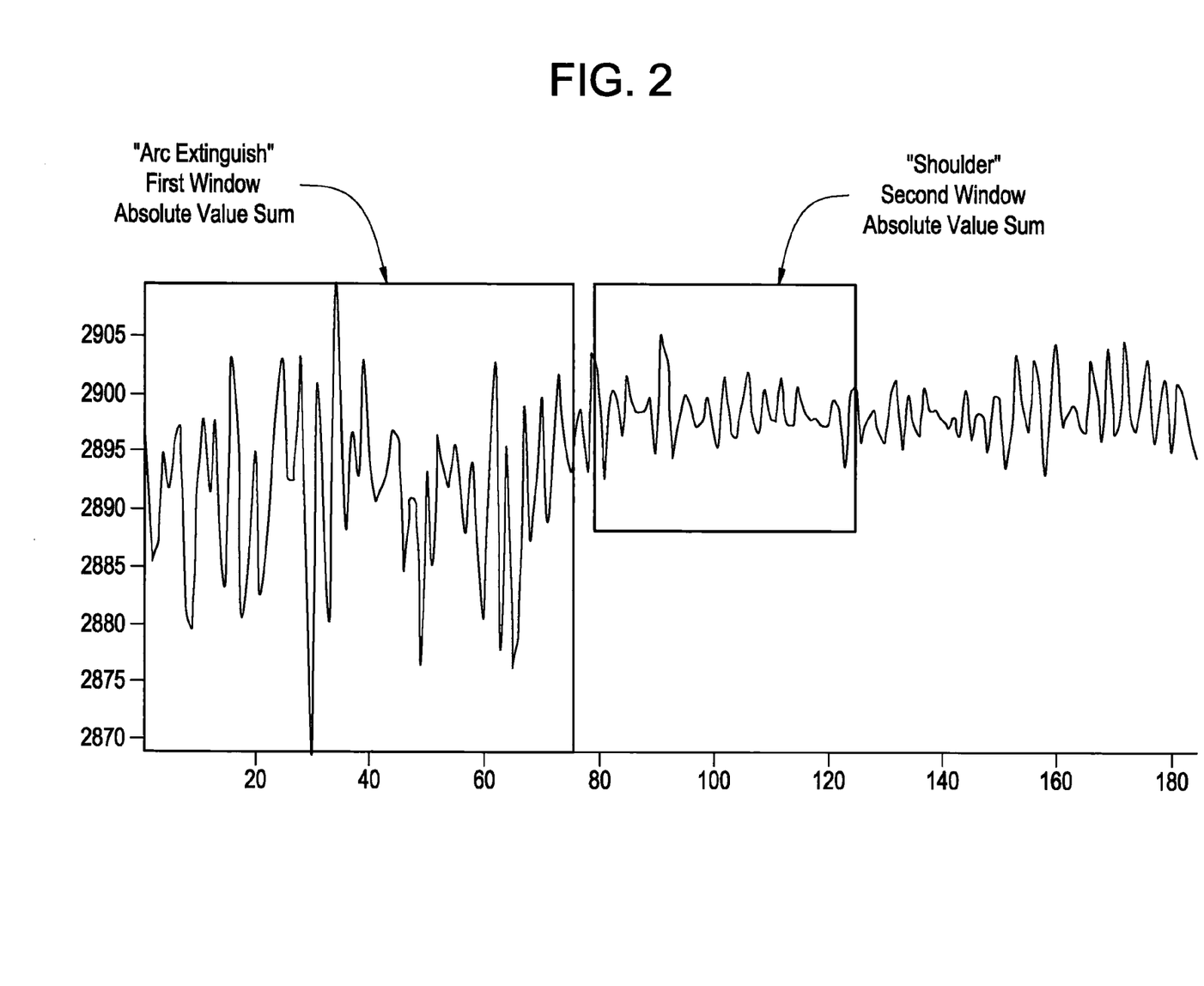
FIG. 2 is a graph of a signal based upon a current of a sensed load in a circuit to which the arc fault current interrupter of FIG. 1 is coupled.

Here, with reference to FIG. 2, it is noted that the decomposition of the secondary signal into the low frequency component signal results in a more pronounced "shoulder" section thereof As such, the high to low signal content characterized by an arcing condition is relatively easily captured. This is depicted in the first window, which is reflective of the "arc extinguish" condition of the secondary signal, and the second window, which is reflective of the "shoulder" section of the secondary signal. Here, the sizes and positions of the first and second windows are arrived at by optimization calculations. It is further noted that, since a signal content tends to shift as current increases, the usefulness of the second frequency component of the secondary signal decreases as a current of the sensed load increases.

Once the detailed and approximate coefficients are obtained, as discussed below with reference to FIGS. 4 and 5, the microcontroller 80 calculates a sum of absolute values of the detailed coefficients (SumCD), a current dependent offset of the sum (SumCD_offset), which depends upon the current of the sensed load as detected by the current measurement unit 50, and a ratio of first and second sums of absolute values of the approximate coefficients (Ratio). The first sum of the absolute values of the approximate coefficients are calculated from the first set of approximate coefficients, which are obtained from the first window of FIG. 2, and the second sum of the absolute values of the approximate coefficients are calculated from the second set of approximate coefficients, which are obtained from the second window of FIG. 2.

The microcontroller 80 generates a trip signal $S_T$, as shown in FIG. 1, when a product (Product) of the SumCD minus the SumCD_offset and the Ratio indicates, a predetermined number of times during a given time period, that one or more threshold conditions for trip signal $S_T$ generation are satisfied. Here, an exemplary threshold condition may refer to a signal measurement, which indicates that an arcing condition in the sensed load occurs.

In detail, where the current of the sensed load is below 15 Amps and, if the Product has a value that is greater than 300, the one or more threshold conditions for trip signal $S_T$ generation are indicated as being satisfied. Here, SumCD is calculated from the high frequency component signal, SumCD_offset is calculated from the RMS current multiplied by 20 and Ratio is calculated from the low frequency component signal. If SumCD is less than SumCD minus SumCD_offset, the Product is calculated as having a value of zero and it is determined that the one or more threshold conditions for trip signal $S_T$ generation are not satisfied. If, however, SumCD is greater than SumCD minus SumCD_offset, the Product is calculated as being equal to the product of SumCD minus SumCD_offset and the Ratio and it is determined that the one or more threshold conditions for trip signal $S_T$ generation are satisfied if the Product has a value that is greater than 300.

Where the current is greater than 15 Amps, since a signal content tends to shift as current increases, the usefulness of the low frequency component decreases, as mentioned above, only the value of SumCD is used to determine whether the one or more threshold conditions for trip signal $S_T$ generation are satisfied. That is, for currents between 15 and 22.5 Amps, the one or more threshold conditions for trip signal $S_T$ generation are satisfied if SumCD has a value that is greater than 300. Similarly, for currents above 22.5 Amps, the one or more threshold conditions for trip signal $S_T$ generation are satisfied if SumCD has a value that is greater than 400.

In accordance with current regulations, required trip times are given as in the following Table 1:

TABLE 1

| Test current, Amperes[c] | 15 Amp AFCI | 20 Amp AFCI | 30 Amp AFCI |
| --- | --- | --- | --- |
| 5 | 1 sec | 1 sec | 1 sec |
| 10 | 0.4 sec | 0.4 sec | 0.4 sec |
| Rated current | 0.28 sec | 0.2 sec | 0.14 sec |
| 150% rated current | 0.16 sec[a] | 0.11 sec[a] | .1 sec |
|  | 0.19 sec[b] | 0.14 sec[b] |  |

[a]Required clearing time when switch is closed on the load side of the AFCI
[b]Required clearing time when the AFCI is closed on the fault
[c]Tests at 120 V are also applicable to cord AFCIs rated 120 V/240 V In order to meet these trip times, it is required that at least 40% of the cycles in the allotted trip time meet the conditions discussed above. For example, at 5 Amps, 60 line cycles occur in 1 second and 60 times 0.4 equals 24 line cycles. Thus, when 24 or more line cycles out of 60 meet the trip conditions, the microcontroller 80 will generate the trip signal $S_T$.

While embodiments of the invention are disclosed in which a magnitude of the given current load at which the first or the first and second coefficients are employed is 15 Amps, it is understand that other magnitudes may be used as the given current load.

In accordance with embodiments of the invention, each DWT is a short wave of finite length that integrates to zero over its period of existence. The discrete wavelet detailed and approximate coefficients are obtained from each DWT as follows:

where x[n]=an input signal, g[n]=a high pass digital filter from a mother wavelet, and h[n]=a low pass digital filter from the mother wavelet.

Use of the DWTs to obtain the discrete wavelet detailed and approximate coefficients provides several advantages in current signal analysis as compared to other analytical tools, such as Fourier transforms (FT) and Fast Fourier Transforms (FFT). For example, DWTs provide a measure of a correlation between the mother wavelet and the current signal. In addition, DWTs can inform as to what time a particular frequency occurred, are simpler to calculate and allow for a detection of an extinguish/re-strike event, which is characteristic to parallel and series arcs, by also allowing for a search for particular frequencies/patterns at zero cross moments.

Thus, when the microcontroller 80 applies DWTs to an arc detection operation, the microcontroller 80 may operate by identifying a pattern or a signature that can be associated with the arcing, selecting a predetermined mother wavelet that relatively closely correlates with that pattern or signature, selecting a frequency range to analyze the arcing that provides an optimized signal-to-noise ratio, selecting a portion of the waveform as the focus area and selecting the required window(s) size(s) that corresponds to the selected portion of the waveform.

With this in mind, it has been seen that the "Daubechies10" or "db10" mother wavelet is highly suitable for arc detection where the frequency range is set at 93 kHz or more, the sampling frequency is set at 300 kHz and no anti-aliasing filter is applied. Since it has also been seen that indicators of arcing lie at the zero cross points of the current signal, the zero cross points determine when sampling is triggered. Thus, a window size for the sampling frequency of 300 kHz is set as 25.3 degrees such that at least one of either the re-strike or extinguish events of an arc will be caught within the window.

Still referring to FIG. 1, the apparatus may further include an ambient temperature sensor 60 that is coupled to the microcontroller 80. The ambient temperature sensor 60 measures the ambient temperature of, at least, the current sensing device 10 and outputs the measurement to the microcontroller 80. The microcontroller 80 then determines whether to compensate for any temperature changes of the current sensing device 10 in the calculations mentioned above.

In addition, the apparatus may further include a push to test switch 70 including a series arc test configuration 71 and a parallel arc test configuration 72. The push to test switch 70 is coupled to the microcontroller 80 and allows an operator to test the apparatus upon installation in accordance with local and non-local regulations.

The microcontroller 80 may be further configured to introduce a deadband into the signal before the decomposition thereof. Here, any sampled secondary signal that is in the deadband is zeroed and, once the signal is outside of the deadband, the deadband values are subtracted or added depending on whether the secondary signal has a negative or a positive value. The deadband is, therefore, configured to reduce a sensitivity of the microcontroller 80 to analog to digital (A/D) bit dithering.

The apparatus further includes a detection circuit 100 which is configured to detect a zero cross instance of the secondary signal and to instruct the microcontroller 80 to subsequently decompose the secondary signal as described above. In this capacity, the detection circuit 100 is coupled to a neutral electrical source at one side thereof and, at the other side, to an input of the microcontroller 80.

Figure 3:
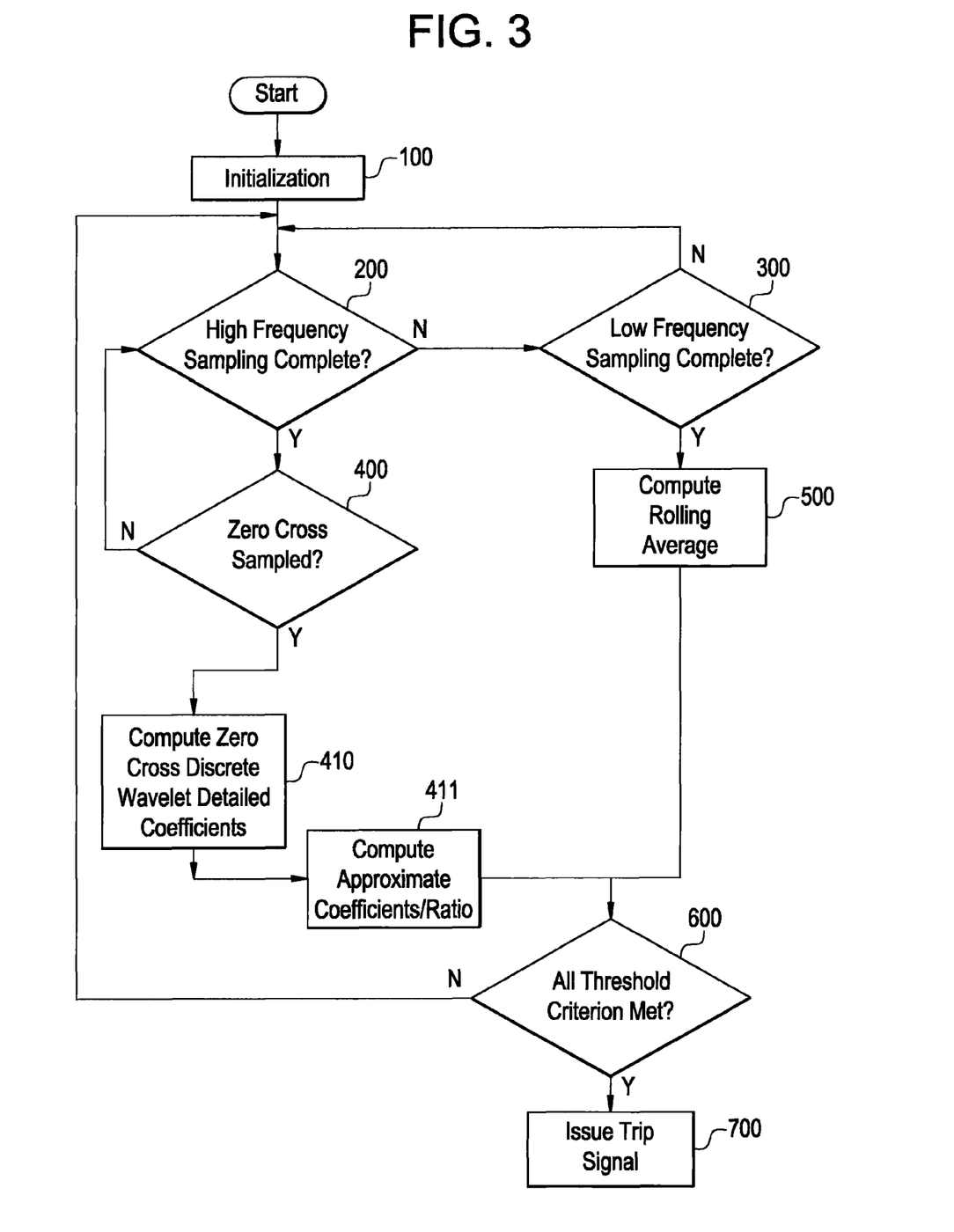
FIG. 3 is a flow diagram of a trip signal issuing algorithm.

With reference now to FIGS. 3-6, a method of performing arc fault current interruption (AFCI) will be described. As shown in FIG. 3, upon initialization of the algorithm (operation 100), which then runs continuously, during which sensing of a load current occurs at a current sensing device 10, a determination is made as to whether high frequency sampling of a secondary signal, which is generated as being based on the sensed load current by a detection unit in signal communication with the current sensing device 10, is complete or not (operation 200).

Figure 4:
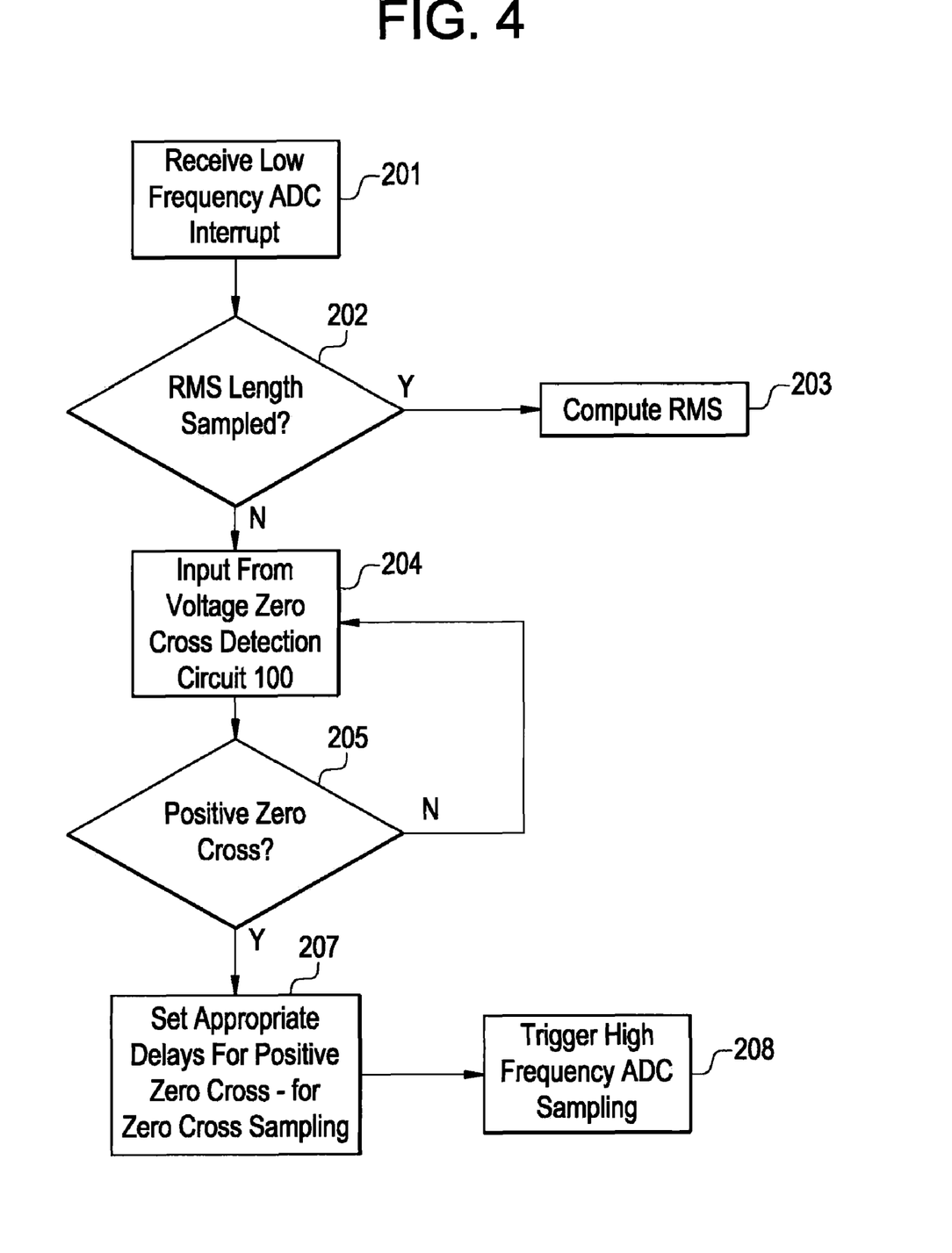
FIG. 4 is a flow diagram illustrating an interrupt handling algorithm.

The high frequency sampling of the secondary signal in operation 200 occurs in accordance with the interrupt handling algorithm of FIG. 4. As shown, the interrupt handling algorithm begins with the receiving at the microcontroller 80 of a low frequency interrupt signal (operation 201), which is based on the secondary signal outputted by the current measurement unit 50. At this point, it is determined whether an RMS length of the secondary signal has been sampled (operation 202) and, if an RMS length has been sampled, a value of the RMS is computed (operation 203). Once the value of the RMS is computed, the value is used to determine how fast the apparatus needs to trip in the presence of an arcing condition. If the RMS length has not yet been sampled, input from the detection circuit 100 is received (operation 204) from which it is determined whether a positive zero cross has occurred (operation 205).

If the positive zero cross has not occurred, control returns to operation 204. If, however, the positive zero cross has occurred, delays for positive zero cross for zero cross sampling are set (operation 207). At this point, the high frequency sampling of operation 200 is triggered.

Referring back to FIG. 3, if the high frequency sampling of the secondary signal is determined to not be complete, the secondary signal is sampled at a low frequency (operation 300) and, if the low frequency sampling is determined to be complete, a rolling average of the low frequency sampled signal is computed (operation 500).

If the high frequency sampling of the secondary signal is completed and if a zero cross is determined to have been sampled in accordance with an output of the detection circuit 100, the zero cross discrete wavelet detailed and approximate coefficients are computed independent of the rolling average (operations 410 and 411, respectively). Conversely, if the high frequency sampling of the secondary signal is complete and if the zero cross is determined to have not been sampled, control returns to operation 200.

Figure 5:
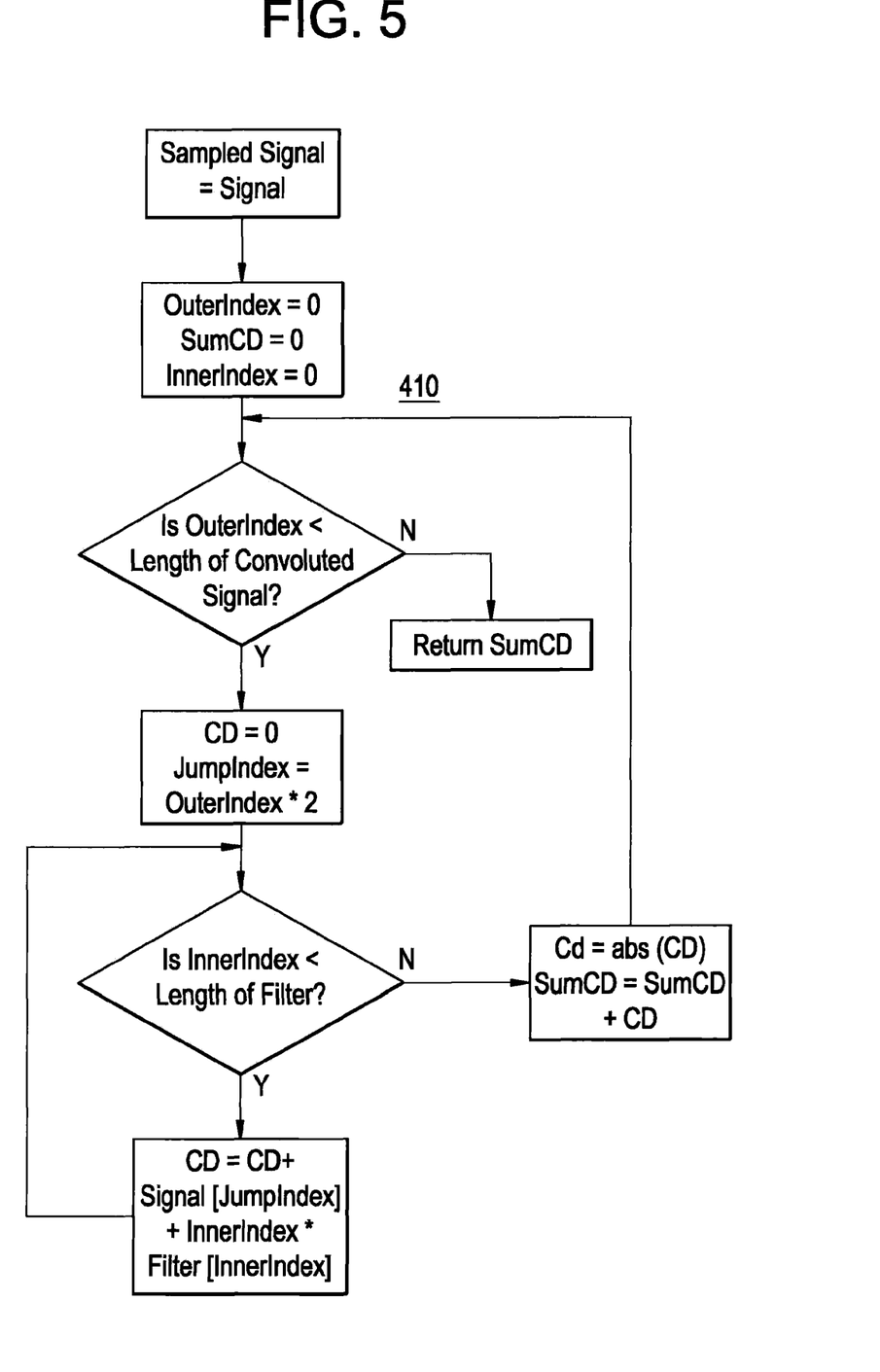
FIG. 5 is a flow diagram illustrating discrete wavelet coefficient computing algorithms according to an embodiment of the invention.

Here, with reference to FIG. 5, the illustrated discrete wavelet algorithm is employed in operation 410. As shown, the sampled signal is initially defined as a signal with the OuterIndex, which refers to an index for the convoluted signal, the SumCD, which is the absolute value of the sum of detailed coefficients, and the InnerIndex, which is an index of a filter in use, each being set to zero.

First, whether the OuterIndex is less than a length of the convoluted signal is determined. If the OuterIndex is not less than a length of the convoluted signal, a value of the SumCD is returned to zero. Conversely, if the OuterIndex is less than a length of the convoluted signal, values of the CDs, which are the individual detailed coefficients, are set to zero and a value of a JumpIndex is set to a value of the convoluted signal multiplied by two.

Then, whether the InnerIndex is less than a length of the filter is determined. If the InnerIndex is less than a length of the filter, the values of the CDs are set to the values of the CDs added to a value of the signal. Here, the signal value is a value of the JumpIndex added to a value of the InnerIndex multiplied by a value of the filter. This process is repeated until the InnerIndex is determined to not be less than a length of the filter. At this point, the values of the CDs are set to the absolute values of the CDs and the value of the SumCD is set to the absolute value of the SumCD added to the values of the CDs.

Figure 6:
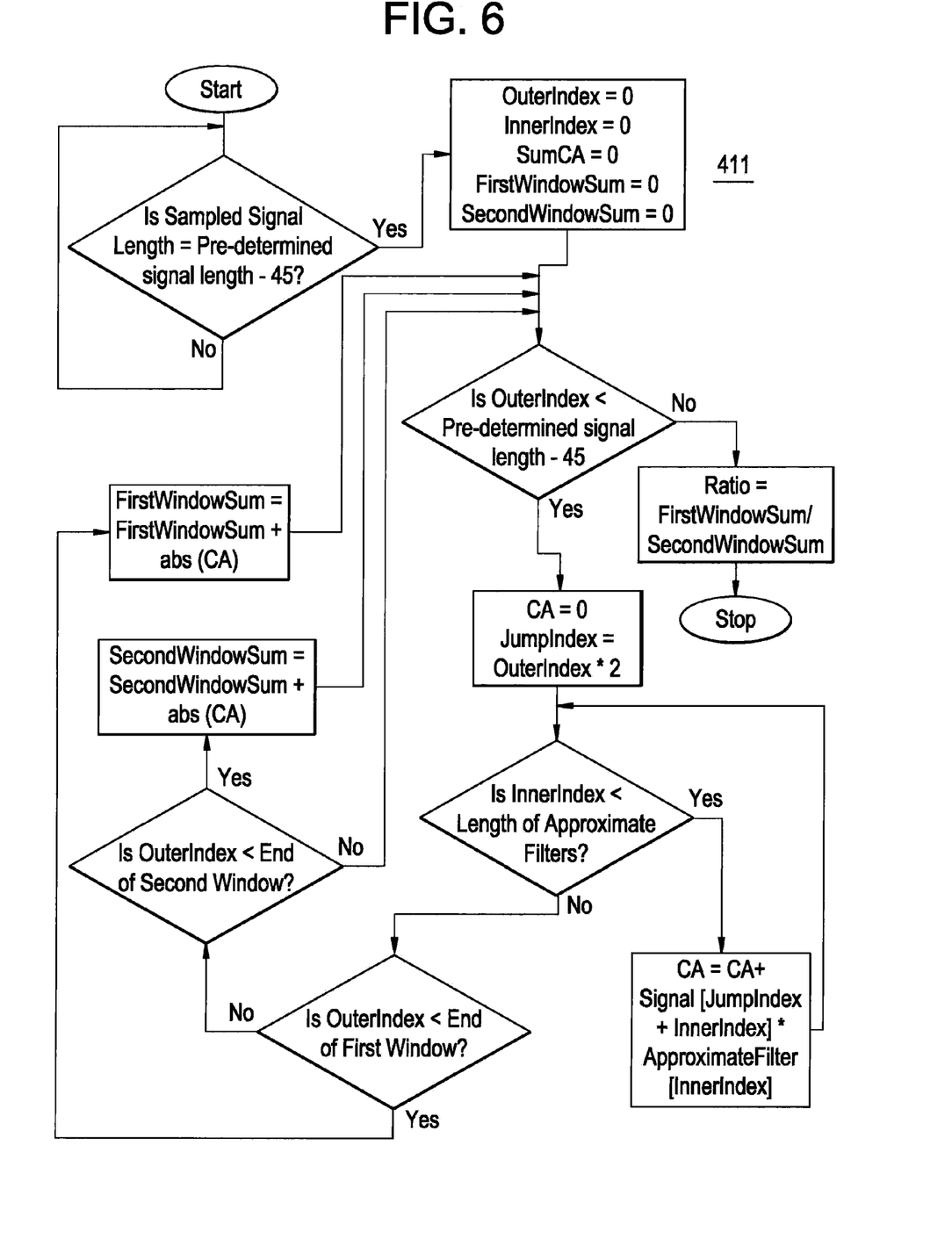
FIG. 6 is a flow diagram illustrating discrete wavelet coefficient computing algorithms according to another embodiment of the invention.

With reference to FIG. 6, the illustrated discrete wavelet algorithm according to another embodiment is employed in operation 411. As shown, it is first determined whether a length of the sampled signal is equal to a predetermined length minus 45. If so, values for the OuterIndex, which refers to an index for the convoluted signal, the SumCA, which is the absolute value of the sum of approximate coefficients, and the FirstWindowSum and the SecondWindowSum, which are each values of the sums of the first and second sets of the absolute values of the approximate coefficients, are set to zero.

At this point, it is determined whether the value of the OuterIndex is less than the predetermined signal length minus 45. If it is not, the value of the Ratio is set as being equal to the FirstWindowSum divided by the SecondWindowSum. If the value of the OuterIndex is less than the predetermined signal length minus 45, the value of the CA is set to zero and a value of a JumpIndex is set to the value of the OuterIndex multiplied by two.

Whether a value of the InnerIndex is less than a length of Approximate Filters is then determined. If it is, the value of the CA is set to the value of the CA added to a value of a signal multiplied a value of an ApproximateFilter, where the value of the signal is multiplied by the sum of the JumpIndex and the InnerIndex, and where the value of the ApproximateFilter is multiplied by the value of the InnerIndex. If the value of the InnerIndex is not less than a length of Approximate Filters, it is determined whether the value of the OuterIndex is less than a value of an end of the first window.

If the value of the OuterIndex is less than the value of an end of the first window, the value of the FirstWindowSum is set to the value of the FirstWindowSum as being added to an absolute value of the CA and it is again determined whether the value of the OuterIndex is less than the predetermined signal length minus 45. If the value of the OuterIndex is not less than the value of the end of the first window, it is determined whether the value of the OuterIndex is less than a value of an end of the second window. Here, if the value of the OuterIndex is not less than the value of the end of the second window, it is again determined whether the value of the OuterIndex is less than the predetermined signal length minus 45. If the value of the OuterIndex is less than the value of the end of the second window, the value of the SecondWindowSum is set to the value of the SecondWindowSum added to an absolute value of the CA and it is again determined whether the value of the OuterIndex is less than the predetermined signal length minus 45.

With reference back to FIG. 3, once the detailed and approximate coefficients are computed, it is determined whether all threshold criteria have been met (operation 600), as discussed above. If all threshold criteria have not been met, control returns to operation 200. If, however, all threshold criteria have been met, a trip signal $S_T$ is issued (operation 700).

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to receive and to decompose a secondary signal into first and second coefficients, and to generate a trip signal for use in interrupting an operation of an electrical circuit when a current of a sensed load is below a predetermined threshold and the first and second coefficients cooperatively indicate that threshold conditions for trip signal generation are satisfied or when a current of the sensed load is above the predetermined threshold and the first coefficients alone indicate that the threshold conditions are satisfied.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. An apparatus for facilitating interruption of current in an electrical circuit, the apparatus comprising:
   a current sensing device disposed in the electrical circuit to service an electrical load, the current sensing device being productive of an output signal representative of a load current passing therethrough;
   a detection unit, in signal communication with the current sensing device such that the output signal produced by the current sensing device is received by the detection unit, the detection unit being configured and disposed to output a secondary signal based on the output signal; and
   a microcontroller, coupled to the detection unit, being responsive to computer executable instructions which, when executed by the microcontroller, cause the microcontroller to receive and to decompose the secondary signal into detailed and approximate coefficients, and to generate a trip signal for use in interrupting an operation of the electrical circuit when a current of the sensed load is above a predetermined threshold and the detailed and approximate coefficients cooperatively indicate that threshold conditions for trip signal generation are satisfied.

2. The apparatus according to claim 1, further comprising a current measurement unit, configured to output to the microcontroller a measurement signal, which is related to a timing of the output signal and which is employed by the microcontroller in a determination of whether the threshold conditions are indicated as being satisfied.

3. The apparatus according to claim 1, further comprising an ambient temperature sensor coupled to the microcontroller by which the microcontroller determines whether to compensate for temperature changes of the current sensing device.

4. The apparatus according to claim 1, further comprising a summing amplifier, including a filter, operably disposed between the current sensing device and the detection unit and in signal communication with the microcontroller,
   wherein the filter of the summing amplifier and the detection unit cooperatively filter components of the secondary signal having frequencies outside of a range of about 1-250 kHz from the secondary signal.

5. The apparatus according to claim 1, wherein the detailed coefficients are obtained from components of the secondary signal having frequencies in a range of about 75-250 kHz, and the approximate coefficients are obtained from components of the secondary signal having frequencies in a range of about 1-75 kHz.

6. The apparatus according to claim 1, wherein the microcontroller is further responsive to computer executable instructions which, when executed by the microcontroller, cause the microcontroller to introduce a deadband into the signal before the decomposition of the secondary signal.

7. The apparatus according to claim 1, further comprising a detection circuit, disposed in signal communication with the microcontroller, wherein the detection circuit is further configured and disposed to detect a zero cross instance of the output signal and to instruct the microcontroller to subsequently decompose the secondary signal.

8. The apparatus according to claim 1, wherein, if the current of the sensed load exceeds a predetermined amperage, the microcontroller generates the trip signal when the detailed coefficients indicate that threshold conditions for trip signal generation are satisfied at a predetermined frequency for a given period of time.

* * * * *